UNITED STATES PATENT OFFICE.

CHARLES B. JACOBS, OF PORT CHESTER, NEW YORK.

COMPOUND FOR MAKING PEROXID OF HYDROGEN.

1,076,039.     Specification of Letters Patent.     Patented Oct. 21, 1913.

No Drawing.     Application filed July 9, 1904. Serial No. 215,915.

*To all whom it may concern:*

Be it known that I, CHARLES B. JACOBS, a citizen of the United States, and a resident of the city of Port Chester, county of Westchester, and State of New York, have invented certain new and useful Improvements in Compounds for Making Peroxid of Hydrogen, of which the following is a specification.

My invention relates to the manufacture of peroxid of hydrogen, and more particularly to a compound to be used in making peroxid of hydrogen.

My invention has for an object the provision of a compound, which compound will not materially vary in efficiency with age; also the provision of a compound which may be used to prepare a solution of peroxid of hydrogen of known strength when wanted, which preparation does not require much time or skill; and also the provision of a compound which may be used for the extemporaneous preparation of a solution of peroxid of hydrogen which without requiring purification is suitable for medicinal purposes. These and other objects of my invention will more fully appear from the following description.

I have discovered that if any acid which will form a peroxid salt be neutralized with the peroxid of an alkali metal, there will result a peroxid salt of the alkali base of the acid used, the loosely held oxygen of the alkali peroxid having attached itself to the acid radical of the compound, while the alkali metal replaces its equivalent of hydrogen in the usual manner, water being given off in the reaction.

The above stated reaction is not confined to any particular acid of the class mentioned nor to any particular alkali metal. Under the proper conditions for each individual compound the reaction will take place with any of the alkali metals and with any of the above stated class of acids, whether they be mono-basic, di-basic, or tri-basic, or whether they belong to the organic or to the mineral kingdom. Each of the alkali metals, sodium, potassium, and lithium will give substantially the same reaction; but I prefer to use the peroxid of sodium on account of its cheapness and the ease with which it may be obtained.

To illustrate the equivalency of the different acids in the class mentioned, three specific cases are given of acids which differ from each other individually but all belonging to the same general class.

If metaboric acid BO(OH) (a monobasic hydroxy acid of the mineral kingdom) be neutralized with sodium peroxid, there results the peroxid compound of sodium metaborate $BO_2(ONa)$ formed according to the following equation:

$$BO(OH) + Na_2O_2 = BO_2(ONa) + NaO)H$$

or empirically written $$HBO_2 + Na_2O_2 = NaBO_3 + NaOH.$$

If carbonic acid

be taken, it would furnish an example of a di-basic hydroxy acid of the organic kingdom. Carbonic acid being impossible to obtain except under prohibitory conditions, I may use instead the acid carbonate of soda

and further neutralize it to the peroxid salt of the normal carbonate of soda according to the reaction expressed by the following equation.

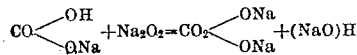

or empirically written $$NaHCO_3 + Na_2O_2 = Na_2CO_4 + NaOH.$$

As an example of a tri-basic organic acid of the above stated class may be taken citric acid

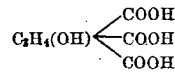

which when fully neutralized with sodium peroxid yields the peroxid salt of normal sodium citrate as expressed by the following empirically written equation:

$$C_6H_8O_7 + 3Na_2O_2 = Na_3C_6H_5O_{10} + 3NaOH.$$

The extra oxygen of these peroxid salts is so lightly held that on treatment with unacidulated water they part with this oxygen in such a manner that the water molecule ($H_2O$) is oxidized to hydrogen peroxid ($H_2O_2$) and there is formed a solution of the normal salt of the acid used in which the hydrogen peroxid is dissolved. In other words, an alkaline but non-caustic and non-acid solution of peroxid of hydrogen is formed when these compounds are dissolved in water. The decomposition by water and the generation of an alkaline solution of hydrogen peroxid is shown for the three specific compounds mentioned by the following empirically written equations:

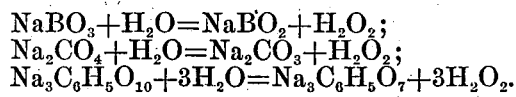

These compounds when anhydrous are stable for an indefinite length of time at temperatures below 65 to 70° C. Above these temperatures they begin to decompose, oxygen being given off in the free state and the normal salt finally remaining as a residue. When chemically pure, and anhydrous, these compounds contain a large amount of extra or lightly held oxygen, which when the compounds are treated with water will combine therewith to form peroxid of hydrogen. For the three compounds above mentioned the amounts of this extra oxygen are respectively as follows: metaborate of sodium peroxid 19.58% by weight; peroxid of sodium carbonate 13.93% by weight; peroxid of sodium citrate 15.68% by weight. They are valuable oxidizing agents on account of their large content of active oxygen and on account of their stability. They are particularly valuable for medicinal and industrial purposes because they furnish a means of accurately weighing in solid and stable form the amount of oxygen that will be liberated as hydrogen peroxid when these salts are decomposed with water. They are also of special value for surgical and medicinal uses because they provide an extemporaneous method of readily producing at the time and place wanted a non-acid and non-caustic but alkaline solution of peroxid of hydrogen of known strength and of any desired strength.

The compounds can be put up in the form of tablets of predetermined weight or strength which merely have to be dissolved in a predetermined quantity of water to produce a solution of peroxid of hydrogen of known strength and of the most favorable character.

In order that my invention may be more fully understood, I will specifically describe the method of producing the peroxid salt of sodium metaborate, or metaborate of sodium peroxid, which is the particular compound I preferably use on account of its large content of active oxygen, the stability of the product, the cheapness of the raw materials, and the ease of manipulation. After analyzing the raw materials which consist of sodium peroxid and metaboric acid, to ascertain their purity, I calculate the proportion of each so as to maintain the molecular equivalents of the following equation:

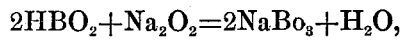

so that the proportion of 87.4 parts by weight of metaboric acid to 78 parts by weight of sodium peroxid is actually present in the reaction. Or I may take in place of the metaboric acid the ortho acid on account of its cheapness and on account of the ease with which it may be obtained. This acid is readily converted into the meta acid by well known chemical means, using in this case the amount of ortho acid required to give on conversion the proper proportion of the meta acid. The metaboric acid is dissolved in water and the solution cooled, preferably between a temperature between 5 and 10° C. The calculated amount of sodium peroxid is then added slowly and in fine particles with constant stirring, the solution being preferably surrounded by a cooling mixture to prevent too great a rise in temperature. At no time during the operation should the temperature be allowed to go above say 20° C., and much better results are obtained both as to the yield and the quality if the temperature is kept below 10° C. The liquid is now set aside with the freezing mixture still around it, and it is preferably allowed to cool almost to zero C. In a few moments crystals begin to appear in the solution and at the end of about one hour the crystallization of the peroxid salt is practically complete. The solution is now quickly drawn off and the crystals thrown into a suction filter and after being thus dried as much as possible, they are washed first with alcohol and finally with ether to thoroughly remove the water. The compound is now further dried to remove the water of crystallization and render it anhydrous. This may be done by placing it under reduced pressure over sulfuric acid for say 24 hours when the material will be found to be stable for an indefinite length of time. The compound may now be pressed into tablets having a predetermined amount of active oxygen so that when one or more of the tablets are dissolved in a predetermined volume of water, an alkaline, non-caustic solution of peroxid of hydrogen of known strength will be obtained.

While I have obtained the best results by the above specifically described mode of procedure, it is distinctly to be understood that my invention is not limited thereto, as many changes may be made in the details of the process and in the materials used without departing from the main principles of the invention and without sacrificing its chief advantages.

Having thus described my invention, what I claim and desire to secure by Letters Patent is:

1. A solid anhydrous compound which when treated with water produces a non-caustic alkaline solution of peroxid of hydrogen.

2. A solid anhydrous compound which when treated with water produces a non-acid and non-caustic solution of peroxid of hydrogen.

3. As an article of manufacture a compound consisting of an anhydrous peroxid salt of the alkaline base of an acid of the peroxid class, which compound when treated with water produces a non-caustic alkaline solution of peroxid of hydrogen.

4. As an article of manufacture a compound consisting of anhydrous metaborate of sodium peroxid, which compound when treated with water produces a non-acid and non-caustic solution of peroxid of hydrogen.

In testimony whereof, I have signed my name to this specification, in the presence of two subscribing witnesses.

CHARLES B. JACOBS.

Witnesses:
 JACOB MILLER,
 J. B. WISHART.